(12) United States Patent
Yamazaki et al.

(10) Patent No.: US 7,787,922 B2
(45) Date of Patent: Aug. 31, 2010

(54) PORTABLE TELEPHONE WITH BROADCAST RECEIVER

(75) Inventors: Yukari Yamazaki, Toyama (JP);
Masashi Koshi, Ishikawa (JP);
Haruhiko Kakitsu, Shizuoka (JP);
Atsuhiko Hashigaya, Kanagawa (JP);
Hiroyuki Sasaki, Kanagawa (JP);
Yutaka Saito, Ishikawa (JP); Kenya Nagano, Ishikawa (JP)

(73) Assignee: Panasonic Corporation, Osaka (JP)

( * ) Notice: Subject to any disclaimer, the term of this patent is extended or adjusted under 35 U.S.C. 154(b) by 686 days.

(21) Appl. No.: 11/577,897

(22) PCT Filed: Oct. 28, 2005

(86) PCT No.: PCT/JP2005/019928
§ 371 (c)(1),
(2), (4) Date: Apr. 25, 2007

(87) PCT Pub. No.: WO2006/046714
PCT Pub. Date: May 4, 2006

(65) Prior Publication Data
US 2009/0131129 A1    May 21, 2009

(30) Foreign Application Priority Data
Oct. 28, 2004    (JP) ............................... 2004-314255

(51) Int. Cl.
*H04M 1/00*    (2006.01)
(52) U.S. Cl. .................. 455/575.7; 455/13.3; 455/274; 343/728; 343/764; 343/788; 343/842; 343/870; 375/315
(58) Field of Classification Search ................ 455/574, 455/575.7, 575.3; 381/384; 343/702
See application file for complete search history.

(56) References Cited

U.S. PATENT DOCUMENTS 6,006,117 A  * 12/1999  Hageltorn et al. ......... 455/575.7
7,292,705 B2 * 11/2007  Harano ....................... 381/384
7,502,638 B2 *  3/2009  Shimizu et al. .......... 455/575.7

(Continued)

FOREIGN PATENT DOCUMENTS

EP          1 306 922       5/2003

(Continued)

OTHER PUBLICATIONS

International Search Report (PCT/JP2005/019928) dated Dec. 27, 2005.

(Continued)

*Primary Examiner*—Lester Kincaid
*Assistant Examiner*—Charles Shedrick
(74) *Attorney, Agent, or Firm*—Seed IP Law Group PLLC

(57) ABSTRACT

To provide a cell phone equipped with a broadcast receiver that delivers a high receiving sensitivity and antenna performance in various usage states.

A loop element 12 as an antenna for receiving television broadcast is arranged in a range (c) of an upper end portion of an upper housing 1. An end part of an upper circuit board 6 is matched with a portion shown by (a) so that a conductor other than the antenna element does not exist in the range (c). A monopole element 19 for cell phone communication is arranged at a lower end portion of a lower housing 2.

10 Claims, 14 Drawing Sheets

U.S. PATENT DOCUMENTS

| | | | |
|---|---|---|---|
| 7,522,947 B2 * | 4/2009 | Tsuda | 455/575.3 |
| 2004/0027296 A1 | 2/2004 | Gerber | |
| 2004/0219956 A1 * | 11/2004 | Iwai et al. | 455/575.3 |
| 2005/0119035 A1 * | 6/2005 | Miyano et al. | 455/575.7 |

FOREIGN PATENT DOCUMENTS

| | | |
|---|---|---|
| EP | 2004228665 A | 8/2004 |
| JP | 10-084209 | 3/1998 |
| JP | 2000-77934 | 3/2000 |
| JP | 2001-332930 | 11/2001 |
| JP | 2002-151939 | 5/2002 |
| JP | 2004-179995 | 6/2004 |
| JP | 2004-228790 | 8/2004 |
| JP | 2004-241939 | 8/2004 |
| JP | 2005-217917 | 8/2005 |
| WO | 02/054532 | 7/2002 |

OTHER PUBLICATIONS

European Office Action.

European Search Report Dated Oct. 9, 2007.

* cited by examiner

PORTABLE TELEPHONE WITH BROADCAST RECEIVER

TECHNICAL FIELD

The present invention relates to a broadcast receiving antenna housed in a cell phone equipped with a feature to receive broadcasts such as a television broadcast.

BACKGROUND ART

As a broadcast receiving antenna equipped with a television broadcast receiving feature, there is known a configuration using a loop antenna such as one described in JP-A-10-084209.

DISCLOSURE OF THE INVENTION

In case the related antenna described in JP-A-10-084209 is housed in a clamshell cell phone having a structure where the upper and lower housings can be folded about a hinge as an axis, an antenna element housed in either housing is in proximity to a conductor having a ground potential such as a circuit board or a shield case in the other housing when the cell phone is folded, thus resulting in lower antenna performance and degraded receiving sensitivity.

A compact-size broadcast receiving antenna housed in a small cell phone shows a reduced radiation resistance, narrower bandwidth and degraded antenna efficiency as the antenna volume shrinks, resulting in a degraded receiving sensitivity.

Electromagnetic interaction between a broadcast antenna and a cell phone communication antenna may cause degradation of performance of the both.

Another problem is that when the user holds a cell phone in the closed state in the section close to the housed antenna, the receiving sensitivity is degraded.

The invention has been accomplished in view of the above circumstances. An object of the invention is to provide a cell phone equipped with a broadcast receiver that delivers a high receiving sensitivity and antenna performance in a state where the upper and lower housings are unfolded or folded, or in various states where the cell phone is held by the user.

To attain the object, the invention provides a cell phone equipped with a broadcast receiver comprising: a first housing; a second housing; a hinged part for rotatably connecting the first housing and the second housing; and a loop antenna as a first broadcast receiving antenna element provided at the end of the first housing opposite to an end where the hinged part is connected.

With this configuration, it is possible to provide a high broadcast receiving sensitivity while the housings are in the open state.

The invention provides a cell phone equipped with a broadcast receiver comprising: a first housing; a second housing; a hinged part for rotatably connecting the first housing and the second housing; a first broadcast receiving antenna element provided at the end of the first housing opposite to an end where the hinged part is connected; and a cell phone communication antenna element provided at the end of the second housing opposite to an end where the hinged part is connected.

With this configuration, it is possible to provide high cell phone radio antenna performance as well as a high broadcast receiving sensitivity while the housings are in the open state.

A magnetic field antenna is provided as the first broadcast receiving antenna element and an electric field antenna is provided as the cell phone communication antenna element.

With this configuration, it is possible to provide high cell phone radio antenna performance as well as a high broadcast receiving sensitivity while the housings are in the open state.

In the first housing, a circuit board and a conductor component are arranged closer to the hinged part than the first broadcast receiving antenna element. In the second housing, a circuit board and a conductor component are arranged closer to the hinged part than the cell phone communication antenna element.

With this configuration, it is possible to provide high cell phone radio antenna performance as well as a high broadcast receiving sensitivity while the housings are in the open or closed state.

A loop element is used as the first broadcast receiving antenna element.

With this configuration, it is possible to provide a high broadcast receiving sensitivity while the housings are in the open state.

One end of the power feeding part of the loop element is connected to the high frequency ground potential of the first housing.

With this configuration, it is possible to provide a high broadcast receiving sensitivity while the housings are in the open state.

A monopole element is used as the cell phone communication antenna element.

With this configuration, it is possible to provide high cell phone radio antenna performance.

Means is provided for changing the resonance frequency of the first broadcast receiving antenna element to cause the frequency to leave the radio frequency band of television broadcasts in case the cell phone communications are given a first priority with the first housing and the second housing folded.

With this configuration, it is possible to provide high cell phone radio antenna performance.

Means is provided for changing the resonance frequency of the cell phone communication antenna element to cause the frequency to leave the radio frequency band of television broadcasts in case the television broadcast receiving feature is given a first priority with the first housing and the second housing folded.

With this configuration, it is possible to provide a high broadcast receiving sensitivity while the housings are in the open or closed state.

A second broadcast receiving antenna element is provided in close proximity to the end of the second housing where the hinged part is connected. Means for selecting either the first broadcast receiving antenna element or the second broadcast receiving antenna element or diversity reception means is provided.

With this configuration, it is possible to provide a high broadcast receiving sensitivity irrespective of the position the user holds a cell phone.

A magnetic field antenna is provided as the first broadcast receiving antenna element and an electric field antenna is provided as the cell phone communication antenna element.

With this configuration, it is possible to provide a high broadcast receiving sensitivity in a variety of use states.

The second broadcast receiving antenna element is a telescopic meander antenna or a helical antenna.

With this configuration, it is possible to provide a high broadcast receiving sensitivity in a variety of use states.

An earphone cable antenna is provided as a third broadcast receiving antenna element. Means is provided for selecting one of the first broadcast receiving antenna element, the second broadcast receiving antenna element and the earphone cable antenna.

With this configuration, it is possible to provide a high broadcast receiving sensitivity in a variety of use states.

Means is provided for performing diversity reception by using all or any two of the first broadcast receiving antenna element, the second broadcast receiving antenna element and the earphone cable antenna.

With this configuration, it is possible to provide a high broadcast receiving sensitivity in a variety of use states.

Any one of the first housing of the second housing herein constitutes any one of the upper housing and the lower housing.

As described above, according to the invention, it is possible to obtain a high receiving sensitivity at all times in a variety of use states including a state where the housings of a cell phone are unfolded or folded while delivering high cell phone communication performance in a state of viewing television broadcasts.

BEST MODE FOR CARRYING OUT THE INVENTION

First Embodiment

Figure 1:
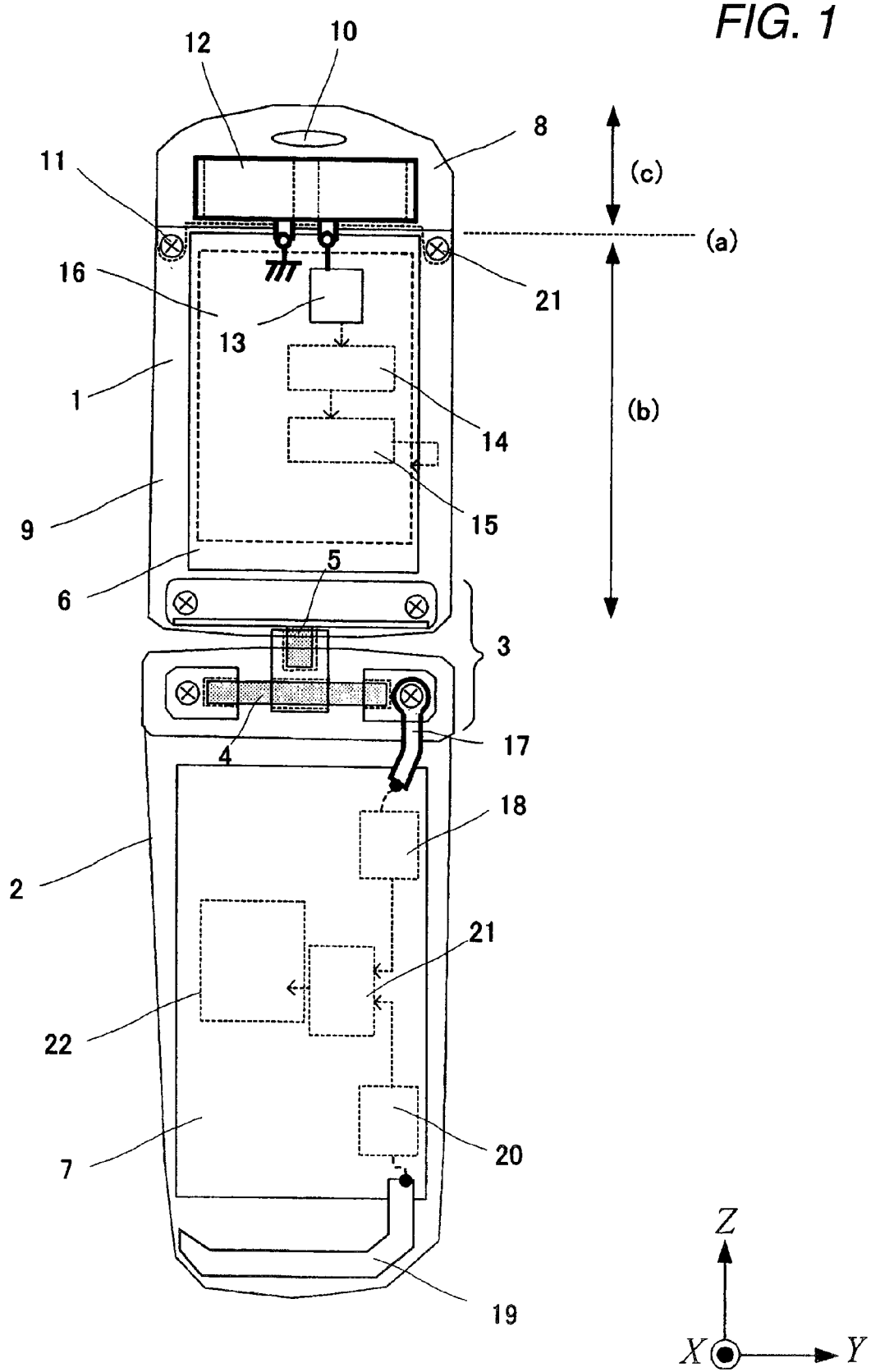
FIG. 1 is a front view of a cell phone equipped with a broadcast receiver according to the first embodiment in the open state.

FIG. 1 is a front view of the basic configuration of a cell phone equipped with a broadcast receiver according to the first embodiment of the invention. FIGS. 2 through 6 illustrate the open and closed states of the housings of the cell phone equipped with a broadcast receiver according to the first embodiment.

As shown in FIG. 1, the cell phone equipped with a broadcast receiver according to this embodiment has a folding structure where an upper housing 1 and a lower housing 2 are rotatably supported by a hinged part 3. FIG. 1 shows the upper housing 1 and the lower housing 2 in the open state.

Figure 2:
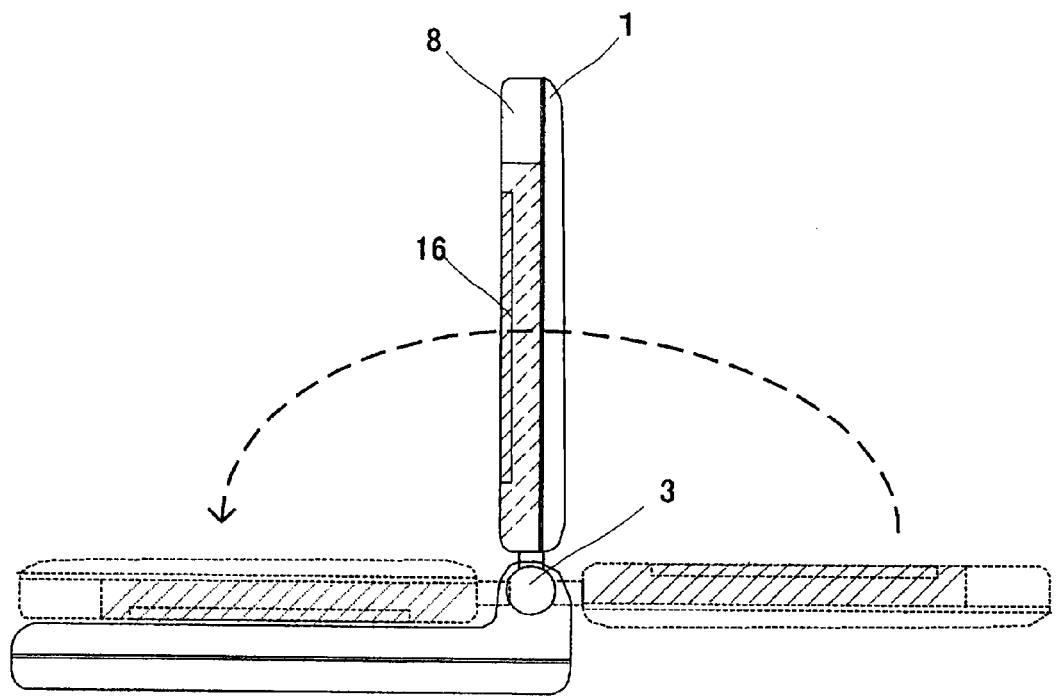
FIG. 2 illustrates rotation of the housings of the cell phone equipped with a broadcast receiver according to the first embodiment.
Figure 3:
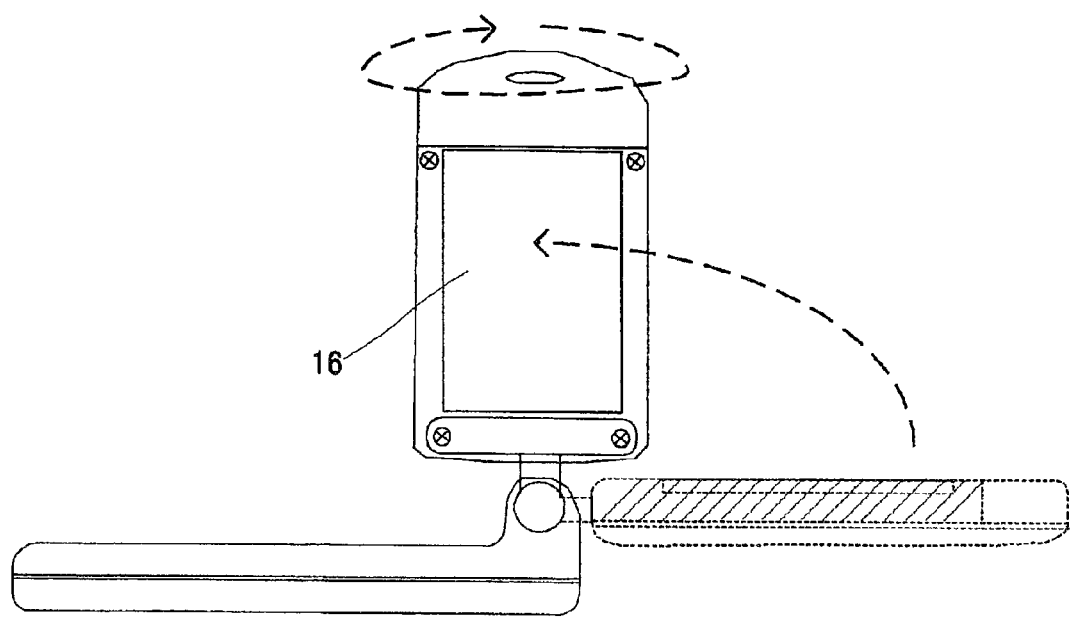
FIG. 3 is a side view of the cell phone equipped with a broadcast receiver according to the first embodiment in the L-open state.
Figure 4:
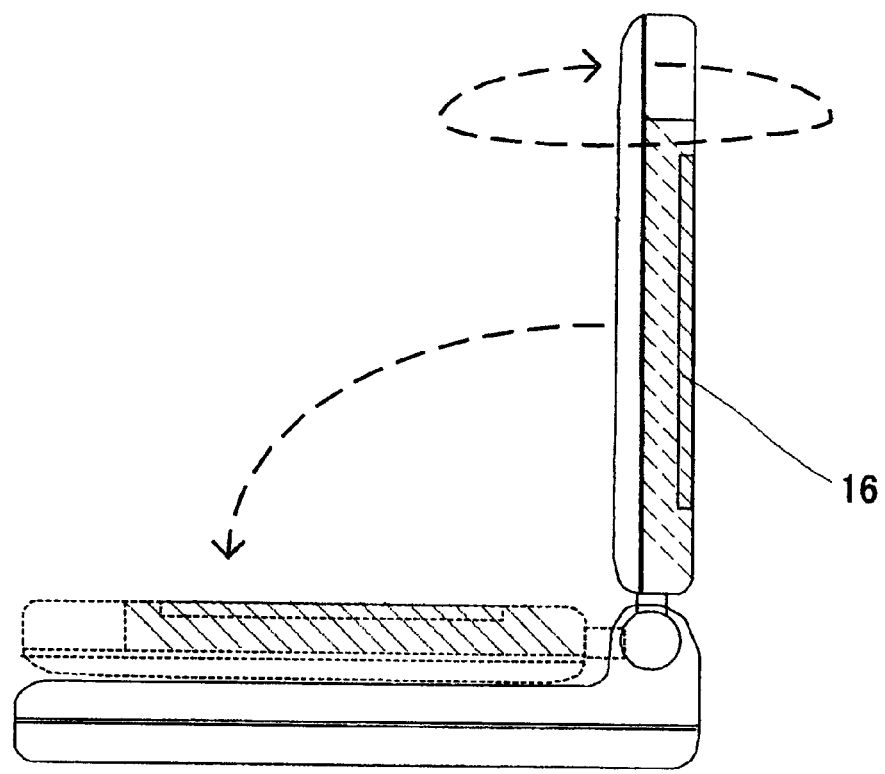
FIG. 4 illustrates rotation of the housings of the cell phone equipped with a broadcast receiver according to the first embodiment.

The hinged part 3 includes a rotation axis 4 and a rotation axis 5 whose rotating directions differ from each other. As shown in FIG. 2, the upper housing is rotated about the rotation axis 4 to place the cell phone in the state where the housings are unfolded or the state where the housings are folded. As shown in FIGS. 3 and 4, when the upper housing is rotated by 180 degrees about the rotation axis 5 with the upper housing 1 and the lower housing 2 orthogonal to each other, it is possible to view a display part 16 while the housings are folded as shown in FIG. 5.

The cell phone thus configured according to this embodiment assumes that television broadcast viewing takes place in one of the four states described below.

Figure 5:
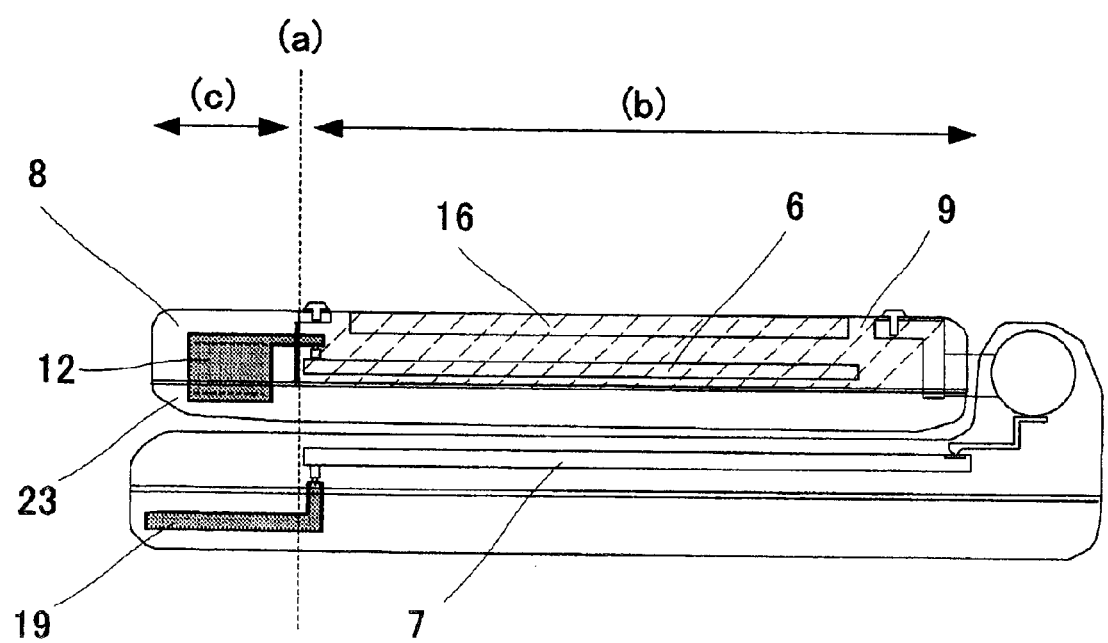
FIG. 5 is a side view of the cell phone equipped with a broadcast receiver according to the first embodiment in the viewer state.

In three states, that is, in a state where the upper and lower housings are unfolded in a linear shape (open state) as shown in FIG. 1, in a state where the upper and lower housings are folded to let the user view the display 16 (viewer state) as shown in FIG. 5, and in a state where the upper housing and the lower housing are unfolded in the L-shape (L-open state) as shown in FIG. 3, it is possible to view broadcasts while watching the screen of the display part 16.

Figure 6:
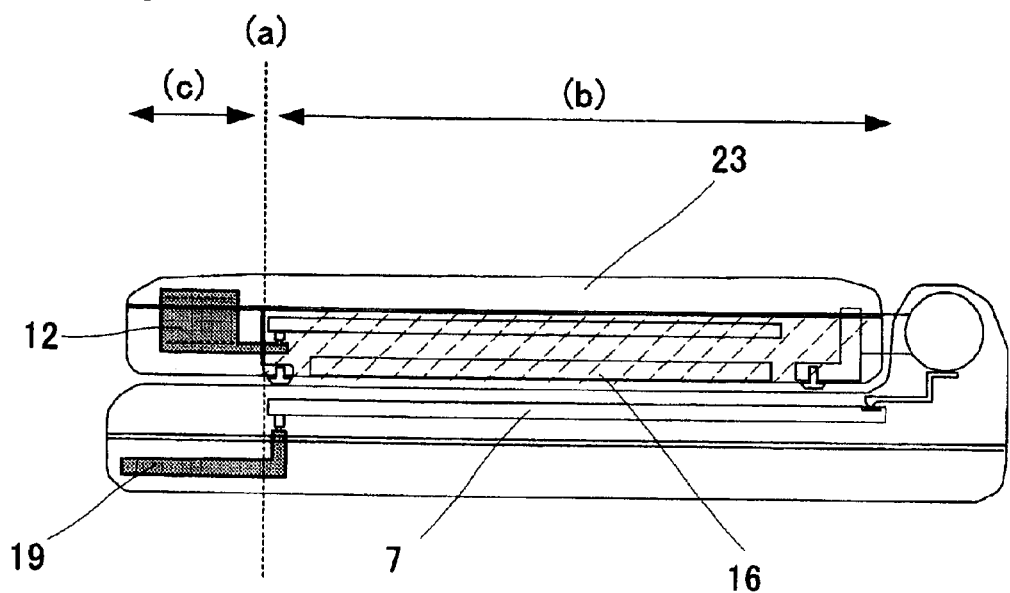
FIG. 6 is a side view of the cell phone equipped with a broadcast receiver according to the first embodiment in the closed state.

In a state where the cell phone is folded to hide the display part 16 (closed state) as shown in FIG. 6, it is impossible to match the television broadcast screen but is possible to listen to the sound by way of an earphone or a speaker.

In FIGS. 5 and 6, the rear cover 23 of the upper housing 1 is composed of a molding made of a resin material having electrical insulation properties. The lower housing 2 is also composed of a molding made of a resin material having electrical insulation properties.

On the surface of the upper housing 1 including the display part 16 is provided a metal frame 9 in the range from the hinged part to a section shown with (a). The metal frame 9 is composed of a metal material having conductivity such as a magnesium alloy and arranged to protect the periphery of the display part 16. At the top end of the upper housing 1, that is, in the range shown with (c) is arranged a resin cover 8 composed of a resin material having electrical insulation properties.

A loop element 12 operates as a built-in antenna for receiving television broadcasts and is arranged inside the resin cover 8. The loop element 12 is a conductor plate having a width of 8 mm and a length of 100 mm in the bent shape. The dimensions of the opening of the loop are for example 45 mm by 5 mm. The loop length in this example is approximately 0.15 times the wavelength in the UHF band (470 MHz) for television broadcasts.

The loop element 12 is arranged so that its opening will be parallel with the direction of thickness and direction of width of a cell phone. Referring to FIG. 1, the opening of the loop element 12 is parallel with the XY plane. In this example, the loop element 12 has a high sensitivity to a horizontal polarization (Y-direction polarization) component.

One end of the power feeding part of the loop element 12 is connected to a matching circuit 13, which performs impedance matching in the range from 470 MHz to 700 MHz as a television broadcast frequency range.

A received signal is input to a broadcast receiver circuit arranged in the range (b) of the upper housing, undergoes demodulation, and drives a liquid crystal display in the display part 16.

The other end of the power feeding part of the loop element 12 is connected to a section corresponding to the high frequency ground potential inside the upper housing. To be more precise, the other end is connected to the metal frame 9 and the ground pattern of an upper circuit board 6 connected thereto in order to be at the same potential.

Figure 7:
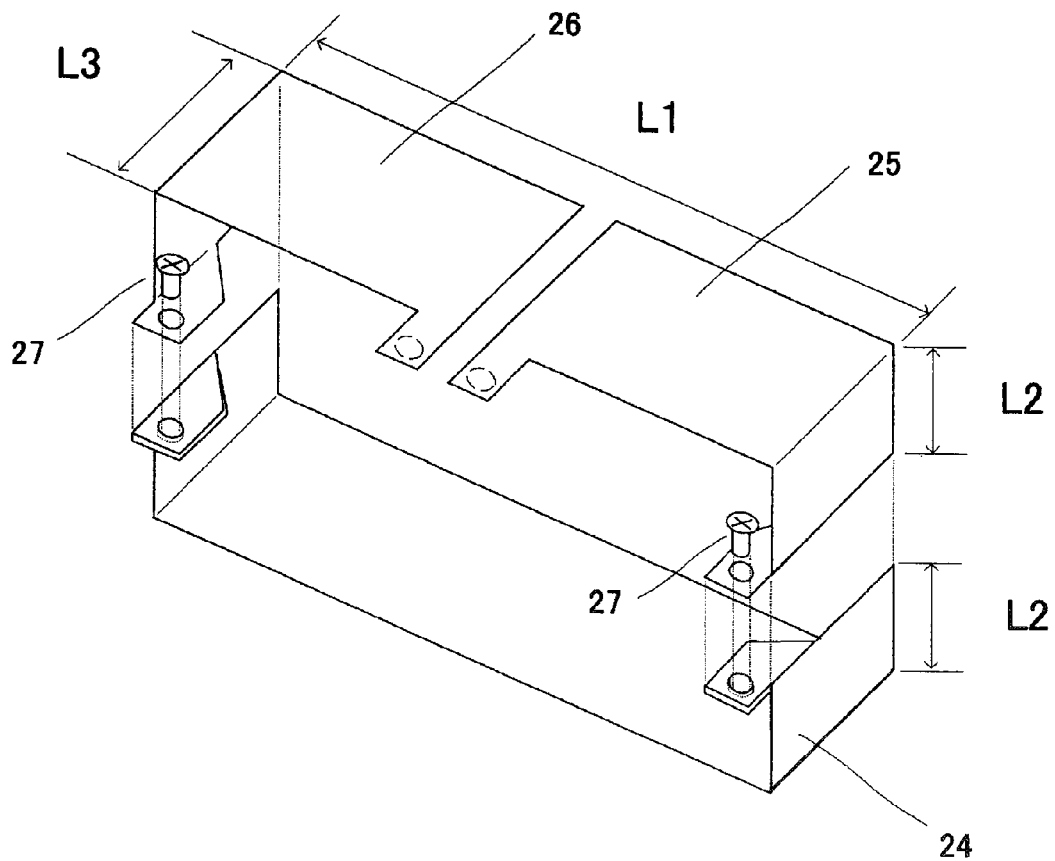
FIG. 7 shows an exemplary configuration of the loop element of the cell phone equipped with a broadcast receiver according to the first embodiment in the closed state.

FIG. 7 shows an exemplary specific structure of the loop element. A channel-shaped conductor plate 24, an L-shaped conductor plate 25 and an L-shaped conductor plate 26 are respectively formed of conductive metals. These conductor plates are mechanically secured and electrically connected by a metal screw 27 to constitute the loop element 12.

A configuration is desirable in terms of reduction of component quantity where the channel-shaped conductor plate 24 is provided as an insert molding or an integral component in the resin of the rear cover 23 shown in FIG. 5, the L-shaped conductor plate 25 and the L-shaped conductor plate 26 are provided as insert moldings or integral components in the resin of the resin cover 8, and the conductor plates are fastened together with the upper housing by using metal screws 27 in the assembly process.

The metal frame 9, the ground pattern and circuit components of the circuit board present in the range (a) can be assumed as a ground potential with respect to the loop element 12 in terms of high frequencies.

The loop element 12 is provided at the top end of the upper housing 1 so that the ground of the range (b) of the upper housing 1, that is, part of the antenna current is distributed on the metal frame 9 and the ground pattern of the circuit board. The antenna current distributed on the ground increases the radiation resistance and thus improving the antenna efficiency.

In case the loop element 12 is arranged at the center of the upper housing 1 or in close proximity to the hinged part, the antenna current distributed on the ground is extremely small, which fails to enhance the antenna efficiency.

By arranging the loop element 12 at the end of the upper housing opposite to an end where the hinged part is provided, that is, at the top end of the upper housing 1, high antenna performance is obtained.

Figure 8:
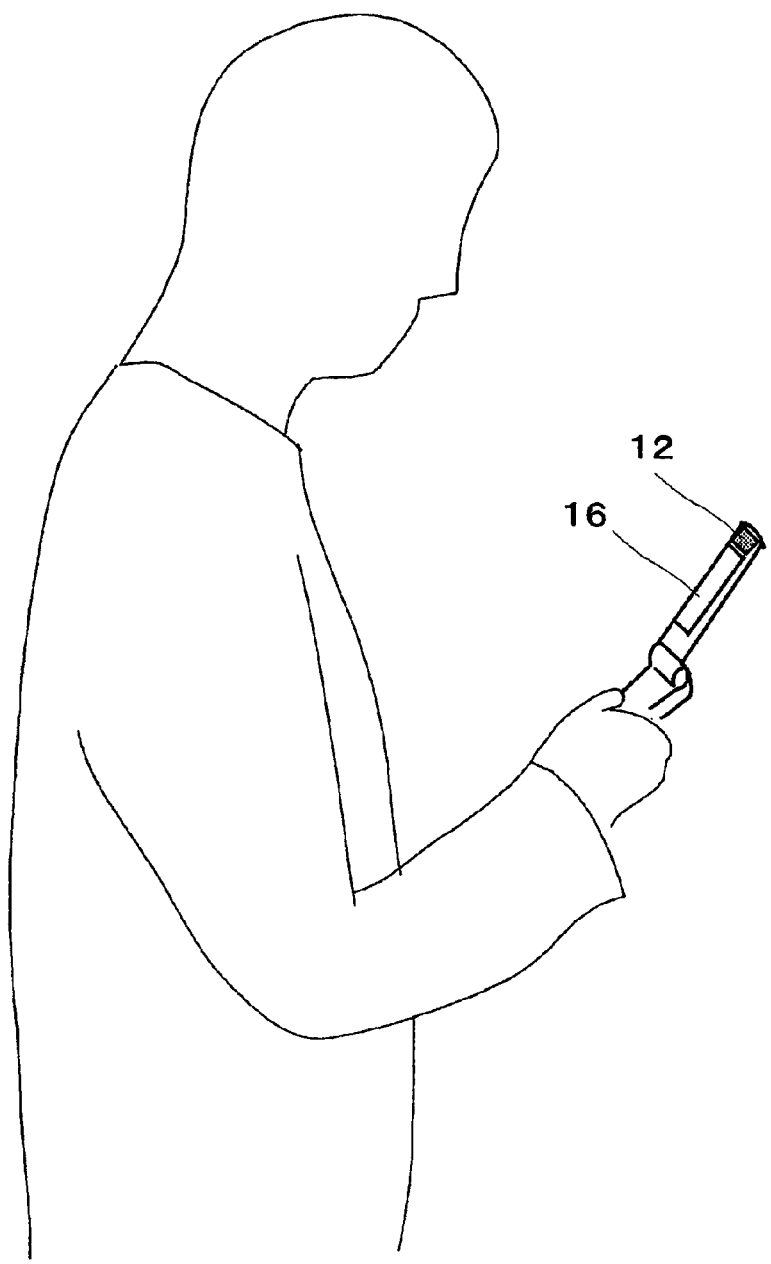
FIG. 8 shows a state of viewing television broadcasts.
Figure 8:
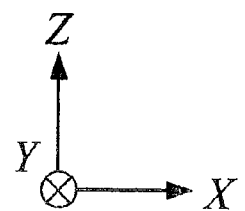
Figure 9:
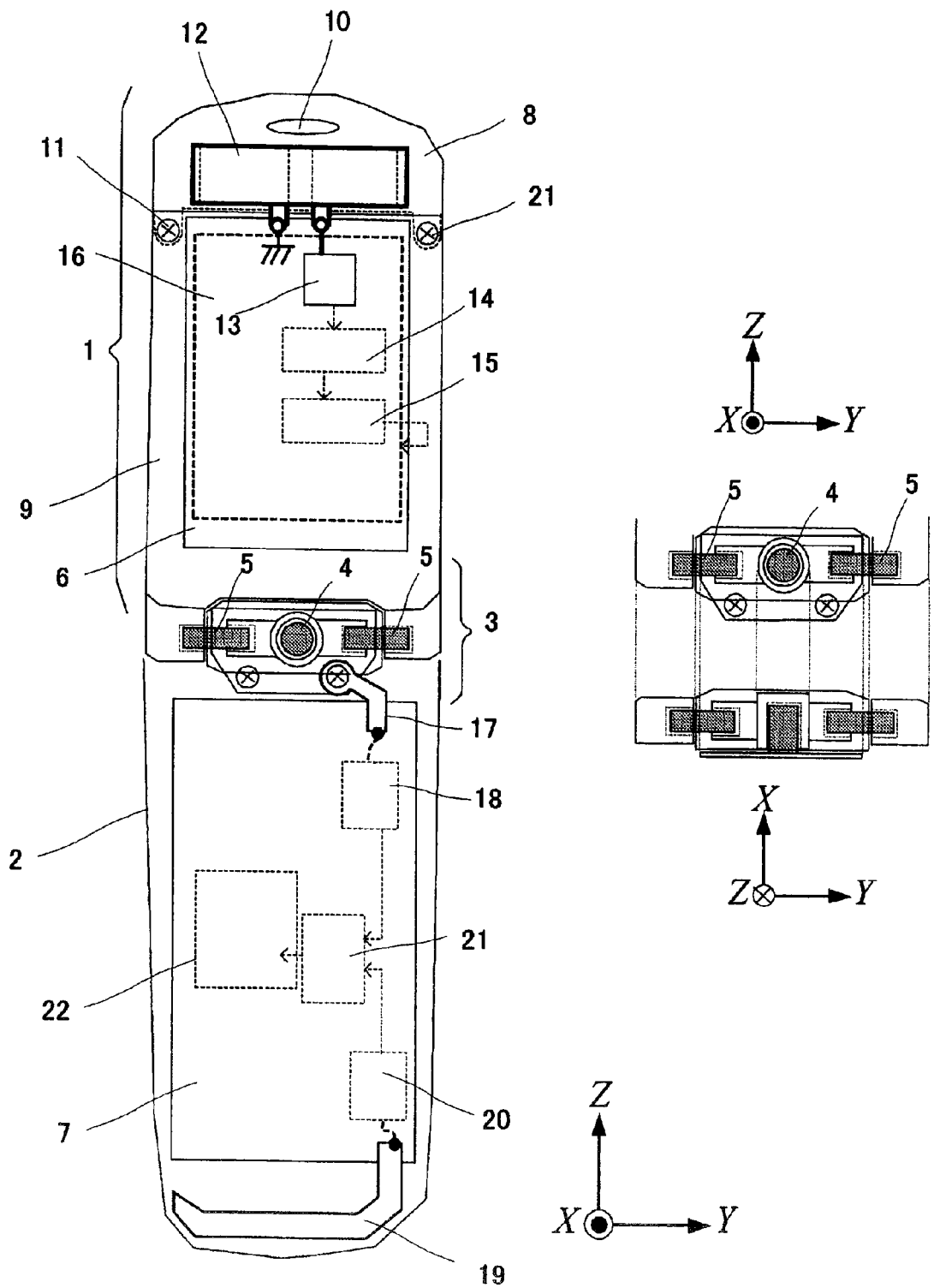
FIG. 9 shows another exemplary hinge configuration of the cell phone equipped with a broadcast receiver according to the first embodiment in the closed state.

In a television viewing posture where the user holds the lower housing with his/her hand as shown in FIG. 8, the loop element 12 provided at the top end of the upper housing 1 is in the remotest position from the hand of the user irrespective of whether the cell phone is in the open state (FIG. 1) or L-open state (FIG. 3). This suppresses possible influence of the user's hand on the antenna performance thus obtaining high antenna performance in these states.

As described above, by arranging the loop element 12 at the top end of the upper housing 1, high antenna performance for television broadcasts is obtained in a television viewing posture where the upper and lower housings are unfolded.

In case a conductive component is placed in close proximity to the loop element 12, the antenna performance of the loop element 12 is considerably degraded. To prevent this, it is important to use an insulating body for a resin cover 8 shown in FIG. 2 and allow a spacing of at least 2 mm between the loop element 12 and the metal frame 9.

One of the reasons a loop antenna is employed as an antenna element for receiving television broadcasts is that the opening of the loop is level in case the cell phone is held open shown in FIG. 1 in the state shown in FIG. 8 and thus the main polarization of the antenna is in horizontal direction, which matches the horizontal polarization waves generally employed in television broadcasts thereby obtaining a high receiving sensitivity.

Another advantage is that a loop antenna operates as a magnetic field antenna and the gain degradation is small when used in close proximity to a human body such as when a cell phone is placed in a pocket.

In case the advantages specific to a loop antenna are not desired, the antenna arranged at the top end of the upper housing need not be a loop antenna but a monopole antenna, an inverted-F antenna, a slot antenna or a dipole antenna composed of a helical element or a meander element delivers the same advantages of arranging an antenna for receiving television broadcasts at the top end of the upper housing.

Next, the configuration of a cell phone communication antenna will be described. Two types of cell phone communication antennas are provided and an optimum antenna may be selected.

Referring to FIG. 1, a first cell phone communication antenna comprises a metal frame 9, a hinged part 3, power feeding sheet metal 17 and a ground arranged on a lower circuit board 7. The ground arranged on the lower circuit board 7 is a conductor pattern arranged almost all over the lower circuit board 7 and acts as the ground potential of a matching circuit 18 and a radio circuit 22 arranged on the lower circuit board 7.

The hinged part 3 is electrically continued via a rotation axis 4 and a rotation axis 5 formed of a conductive metal. A hinged part 3 and a metal frame 9 are mechanically fixed and electrically continued with screws and the like.

Power feeding sheet metal 17 has one end electrically connected to the hinged part 3 and the other end connected to a matching circuit 18. The ground on the matching circuit 18 is connected to have the same potential as the ground as the ground on the lower circuit board 7.

With this configuration, the metal frame 9 and the hinged part 3 operate as an upper element and the ground on the lower circuit board 7 as a lower element, and the whole as a dipole antenna.

According to the first cell phone communication antenna thus configured, it is possible to obtain high antenna performance in the open state shown in FIG. 1 or in the L-open state shown in FIG. 3.

A monopole element 19 as a second cell phone communication antenna is arranged at the bottom end of a lower housing 2 along the width direction of the cell phone or Y-axis direction. It is preferable to allow a spacing of 10 mm between the monopole element and the bottom end of the lower circuit board 7 and avoid placing a conductive component between the monopole element and the lower circuit board in terms of antenna performance.

The monopole element has impedance matching with the cell phone radio frequency by way of a matching circuit 20.

The matching circuit 18 for the first cell phone communication antenna and the matching circuit 20 for the second cell phone communication antenna are connected to an antenna selector circuit 21. The antenna selector circuit 21 selects either of the both antennas and connects it to a radio circuit part 22. One exemplary antenna selecting method is to detect the receiving field strength of each antenna and select an antenna that shows the higher value. Another method is to provide means for detecting the open/close state of the upper/lower housing and select an optimum antenna in accordance with the detected state.

Next, operation of the antenna in the closed state will be described. In FIGS. 5 and 6, an end of the lower circuit board 7 matches the section shown by (a) and no large-sized conductive components such as a ground on the lower circuit board 7 exist in the range (c). With this configuration, no large-sized conductive components are in close proximity to the loop element 12 even in the closed state. This ensures high antenna performance of the loop element 12 in the closed state also. That is, it is possible to obtain a high television receiving sensitivity in the closed state also.

Similarly, an end of the upper circuit board 6 matches the section shown by (a) and with this configuration no large-sized conductive components such as a ground on the upper circuit board 6 exist in the range (c). Thus, no large-sized conductive components are in close proximity to the monopole element 19 even in the closed state. This ensures high antenna performance of the monopole element 19 in the closed state also. That is, it is possible to obtain a high cell phone standby sensitivity by way of the second cell phone communication antenna.

The monopole element 19 and the loop element 12 are in close proximity to each other and the spacing therebetween is about 10 mmm. In this case, the resonance frequency differs between both antenna elements so that the performance degradation caused by the electromagnetic interaction of the antenna elements is negligible.

In the space where both antenna elements are arranged, that is, at the top end of the upper housing and at the bottom end of the lower housing, space is provided where no conductors except an antenna element exist. Thus, the performance degradation caused by the electromagnetic interaction of the antenna elements is suppressed by 5 dB to 10 dB compared with a case where a ground on the circuit board is arranged in close proximity.

When a magnetic field loop element is used as a television broadcast receiving antenna, its operation mode differs from that of the monopole element 19 operating as an electric field antenna. This further suppresses the electromagnetic interaction.

No conductors such as a circuit board except an antenna element exist in the range (c) shown in FIG. 5 or FIG. 6. Thus the same high antenna performance is obtained either in the viewer state in FIG. 5 or the closed state in FIG. 6. For example, In case the upper circuit board 6 exits in the range (c) and the loop element 12 is arranged thereon, the antenna performance of the loop antenna 12 is ensured to some degree in the viewer state in FIG. 5 while the loop element 12 is placed between the upper circuit board 12 and the monopole element 19 in the closed state in FIG. 6, which leads to substantial degradation of antenna performance.

When the loop element 12 is arranged in almost the center of the upper housing in the thickness direction, it is possible to provide a maximum spacing between the loop element 12 and the monopole element 19 in both the viewer state in FIG. 5 and the closed state in FIG. 6, which ensures high antenna performance.

As described above, by arranging a television broadcast receiving antenna element in the space at the top end of the upper housing where no conductors exist and arranging a cell phone communication antenna element in the space at the bottom end of the lower housing where no conductors exist, it is possible to keep a large-sized conductor except an antenna element away from the both antenna elements in the closed state, thus providing high performance of the antennas.

While a large-sized conductor kept away from the antenna elements is a ground on a circuit board in the above description, such a large-sized conductor may be a high frequency ground from the viewpoint of an antenna element, including a battery, a shield case and a metal frame.

The above advantage is obtained with a double-rotation-axis clamshell cell phone including the rotation axis 4 arranged in the X direction and the rotation axis arranged in Y direction.

A cell phone communication antenna is not limited to one according to this embodiment. Other antenna forms such as an inverted-F antenna, a patch antenna, a dipole antenna or a slot antenna that provides the effect caused by its position with respect to the television broadcast receiving antenna element may be employed.

Second Embodiment

Figure 10:
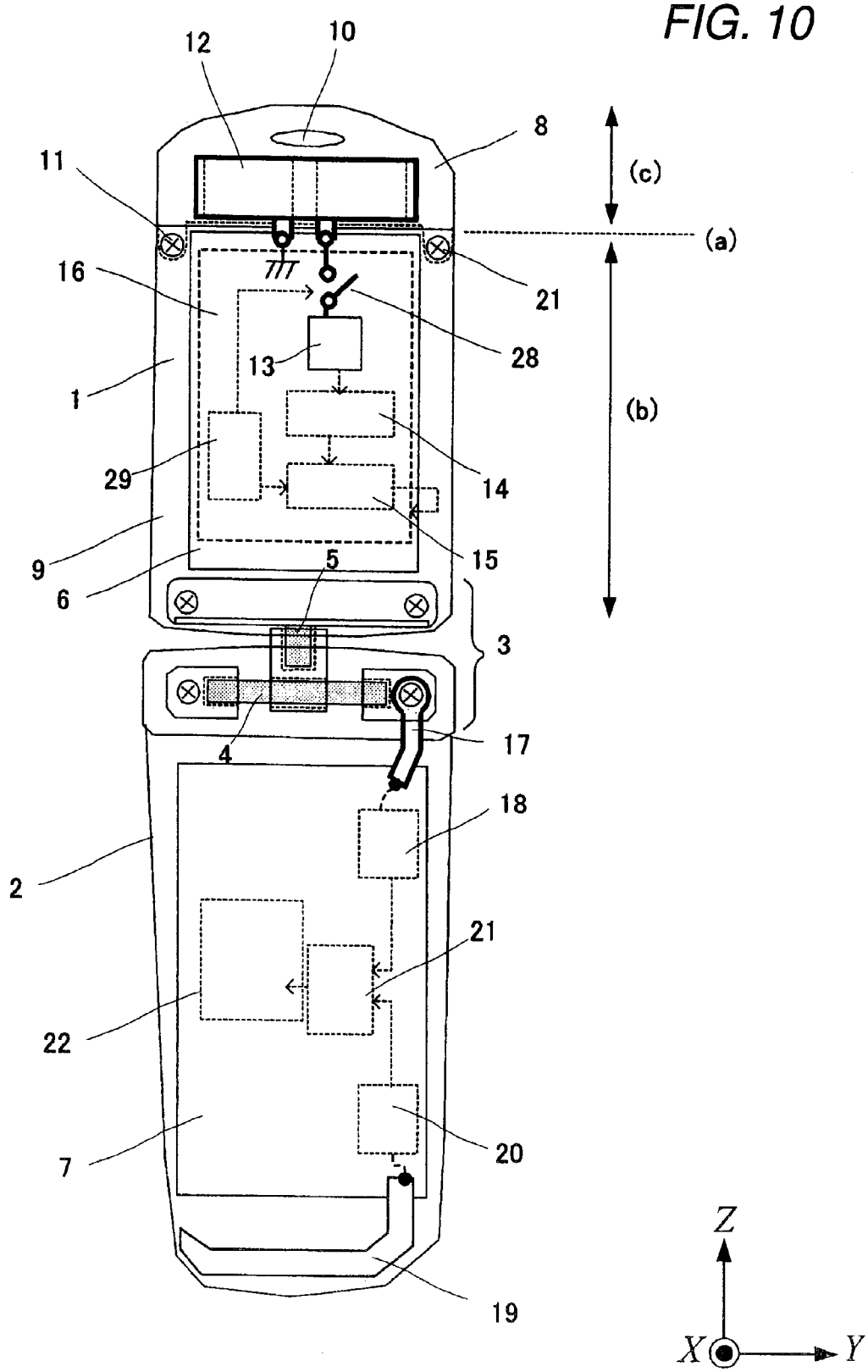
FIG. 10 is a front view of a cell phone equipped with a broadcast receiver according to the second embodiment in the closed state.

FIG. 10 shows a basic configuration of a cell phone equipped with a broadcast receiver according to the second embodiment of the invention. In FIG. 10, a component given a same sign as FIG. 1 performs the same operation and thus detailed description of such a component is omitted.

In FIG. 10, on top of the configuration shown in FIG. 1, a high frequency switch 28 is inserted between a loop element 12 and a matching circuit 12.

When the high frequency switch 28 is turned OFF, the loop element 12 is open and its resonance frequency shifts to an extremely high frequency. In the closed state shown in FIG. 5 or FIG. 6, in case the loop element 12 is open as described above, the electromagnetic interaction between the loop element 12 and a monopole element 19 becomes small and the performance degradation caused by the presence of the loop element 12 is suppressed to a very low level.

Taking advantage of this, a control part 29 may detect that the cell phone is in the closed state and the television broadcast receiving feature is not in use and then turn OFF the high frequency switch. This obtains a high standby sensitivity and communication performance as cell phone features.

Or, the control part 29 may turn OFF the high frequency switch based on the user setting in case the cell phone communication performance is to be given a first priority.

Or, on an incoming call to a cell phone while television broadcast is being received, the control part 29 may forcibly suspend reception of television broadcast and turn OFF the high frequency switch.

The resonance frequency of the loop element 12 is desirably kept away from the radio frequency band for cell phone communications by at least 100 MHz. In case the difference between the resonance frequency of the loop element 12 and the radio frequency band for cell phone communications is less than 100 MHz, a difference of 30 MHz or more delivers effects to some degree.

While cell phone communications are given a first priority in the above example, the invention is not limited thereto. In case the television broadcast receiving performance is given a priority, a high frequency switch may be provided between the monopole element 19 and the matching circuit 20 and selection may be made in a similar manner, the same advantage is obtained.

A method for changing the resonance frequency of an antenna element is not limited to a high frequency switch between the antenna element and a matching circuit. For example, available methods include a method for changing the control voltage of a variable-capacitance diode for tuning, a method for placing a high frequency switch between a ground terminal and a ground on a circuit board, a method for providing a high frequency switch between the matching circuit of an antenna and a radio circuit and terminating the matching circuit of the antenna via a reactance element, a method for partially isolating an antenna element by way of a high frequency switch, and any other method that reduces the electromagnetic interaction between two antennas and enhance the performance of an antenna element in close proximity with a first priority.

Third Embodiment

Figure 11:
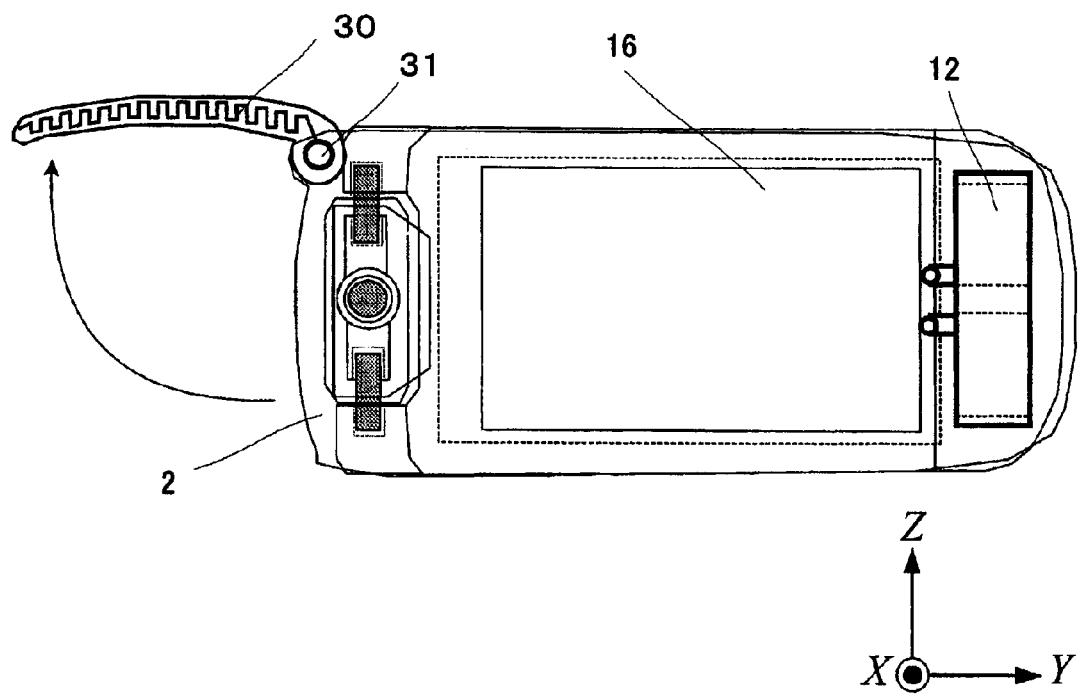
FIG. 11 is a side view of the cell phone equipped with a broadcast receiver according to the third embodiment in the viewer state (open state).
Figure 12:
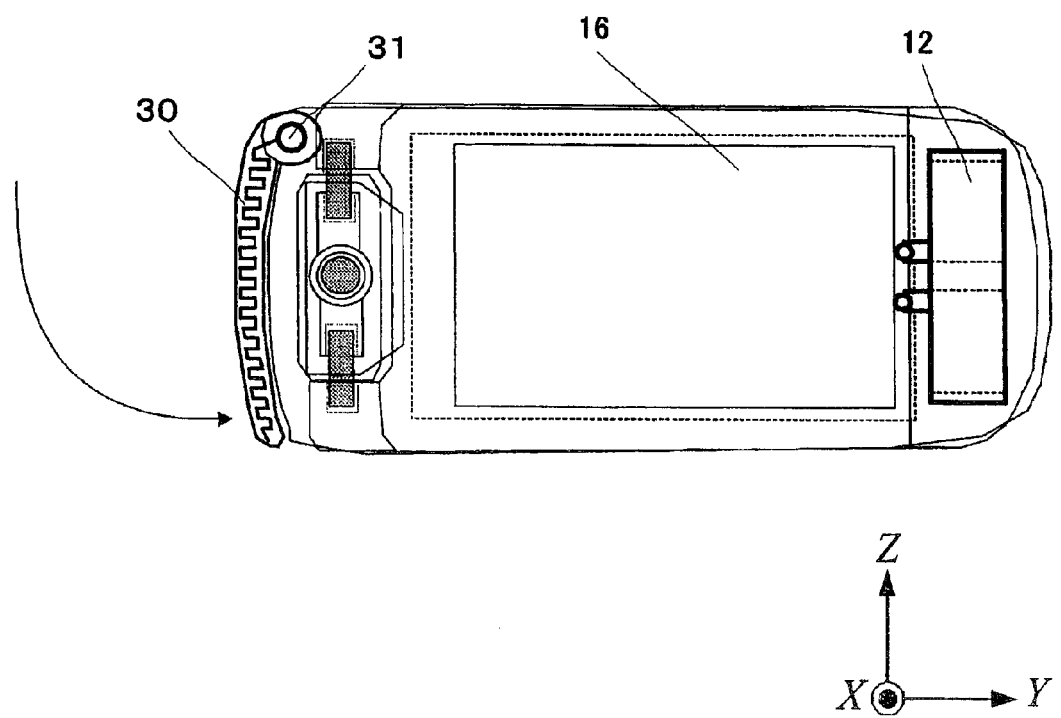
FIG. 12 is a side view of the cell phone equipped with a broadcast receiver according to the third embodiment in the viewer state (closed state).

FIG. 11 shows a basic configuration of a cell phone equipped with a broadcast receiver according to the third embodiment of the invention. In FIG. 11, a component given a same sign as FIG. 1 performs the same operation and thus detailed description of such a component is omitted.

The cell phone equipped with a broadcast receiver shown in FIG. 11 includes a fold-down meander antenna 30 for reception of broadcasts on top of the configuration shown in FIG. 1. FIG. 11 shows a viewer state where the user may watch a display part 16.

The fold-down meander antenna 30 is rotatably supported by a rotation axis 31 in close proximity to the hinged part of a lower housing 2. The fold-down meander antenna 30 rotates about the rotation axis 31 to extend the fold-down meander antenna 30 out of the housing as shown in FIG. 11 or to house the fold-down meander antenna 30 inside the perimeter of the housing.

The fold-down meander antenna 30 is arranged in close proximity to a hinged part so that the fold-down meander antenna is placed away from a monopole element 19 as a cell phone communication antenna. This suppresses degradation of antenna performance caused by electromagnetic interaction between the antennas or interference to the broadcast receiving feature due to transmit waves of cell phone communications.

The fold-down meander antenna 30 generally has a structure where the periphery of a meander line is protected with resin molding. The physical length of the fold-down meander antenna 30 is set to the same dimension as the width of a cell phone (for example around 40 mm). The electrical length of a meander line is set to half or one fourth the wavelength of a television broadcast frequency.

Figure 13:
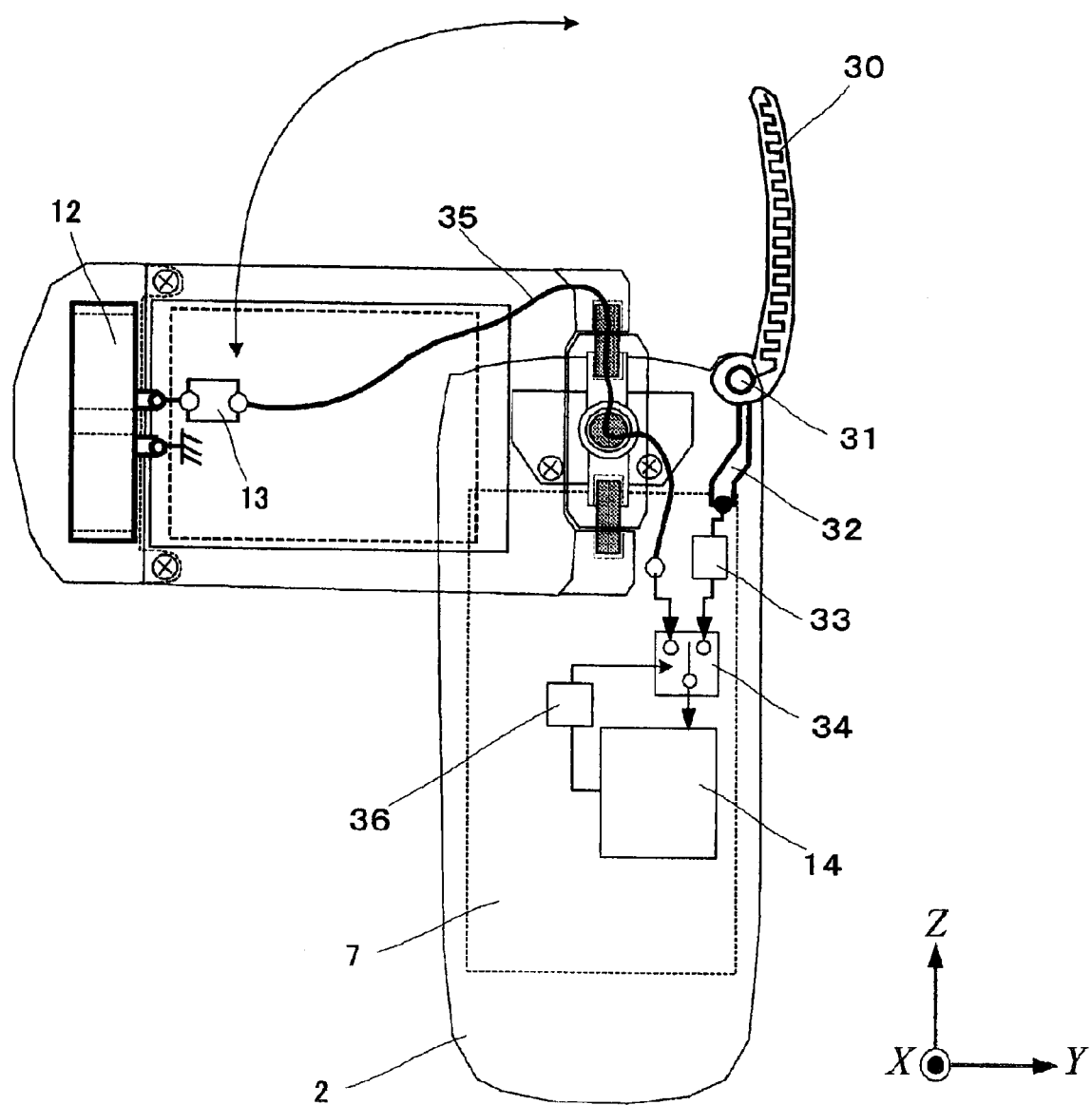
FIG. 13 is a front view of the cell phone equipped with a broadcast receiver according to the third embodiment in the L-open state.

FIG. 13 shows a cell phone in the L-open state in order to illustrate selection between the fold-down meander antenna 30 and a loop element 12

In FIG. 13, the fold-down meander antenna 30 is electrically connected to a power feeding terminal 32 via a rotation axis 31. The power feeding terminal 32 is connected to the upper surface of a lower circuit board 7 by way of spring contact or other means. Power is thus input to a high frequency switch 34.

The loop element 12 is connected to a coaxial cable 35 via a matching circuit 13. The coaxial cable 35 is guided to the lower housing 2 via a hinged part and connected to the upper surface of the lower circuit board 7. A receive signal incoming to the loop element 12 is input to the high frequency switch 34.

The receive signal selected by the high frequency switch 34 is input to a broadcast receiver circuit 14. A control part 36 operates to control the high frequency switch 34 so that the reception level of the broadcast receiver circuit 14 will be maintained at all times. This selects the fold-down meander antenna 30 or the loop element 12 whichever has the higher antenna gain.

Figure 14:
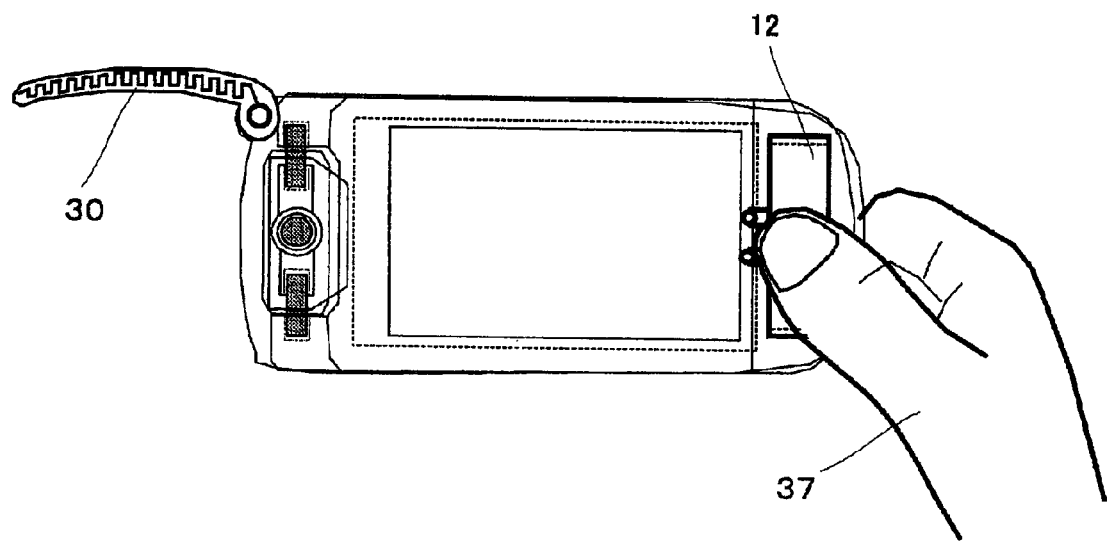
FIG. 14 shows the cell phone equipped with a broadcast receiver according to the third embodiment in the viewer state with the top end held.

As shown in FIG. 14, in case the top end of a cell phone, that is, a section in close proximity to the loop element 12 is held, the antenna performance of the loop element 12 is substantially degraded. In this case, when the fold-down meander antenna 30 is extended, high antenna performance is ensured. The fold-down meander antenna 30 is selected at all times thus obtaining high antenna performance.

Figure 15:
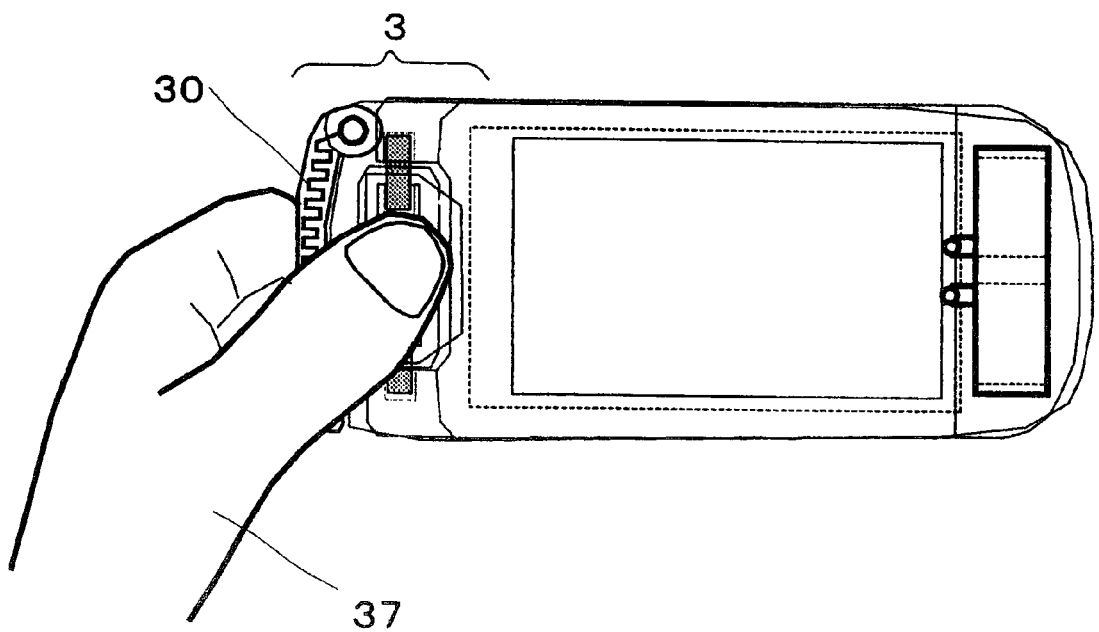
FIG. 15 shows the cell phone equipped with a broadcast receiver according to the third embodiment in the viewer state with the hinged part held.

As shown in FIG. 15, in case the hinged part 3 of a cell phone, that is, a section in close proximity to the fold-down meander antenna 30 is held by a hand 37 of the user, the antenna performance of the fold-down meander antenna 30 is substantially degraded. In this case, the high antenna performance of the loop element 12 is ensured. The loop element 12 is selected at all times thus obtaining high antenna performance.

In the L-open state shown in FIG. 13, high performance is ensured with either the loop element 13 or fold-down meander antenna 30. In this case, either antenna is selected depending on the polarization characteristic of an incoming wave at a receiving point from a transmitting station or the like.

While switching is made so that a broadcast receiver circuit 14 will maintain a high reception level in the above description, the invention is not limited thereto but an optical sensor, a magnetic sensor or a mechanical switch may be used to detect the open/closed state of the upper/lower housing, and either of the two antennas may be accordingly selected.

In this example, it is preferable to cause the loop element 12 to be selected in the open or L-open state while the fold-down meander antenna 30 to be selected in the viewer or closed state from the standpoint of a high receiving sensitivity.

Means may be provided for detecting the position of a hand of the user such as an optical sensor or an electrostatic sensor and thereby the antenna on the side not held by the hand.

In case the fold-down meander antenna 30 is housed, the antenna performance is substantially degraded. For example, means for detecting the extended/housed state of the fold-down meander antenna 30 such as an optical sensor, a magnetic sensor or a mechanical switch is desirably provided so as to cause the loop element 12 to be forcibly selected in case the fold-down meander antenna 30 is housed.

Figure 16:
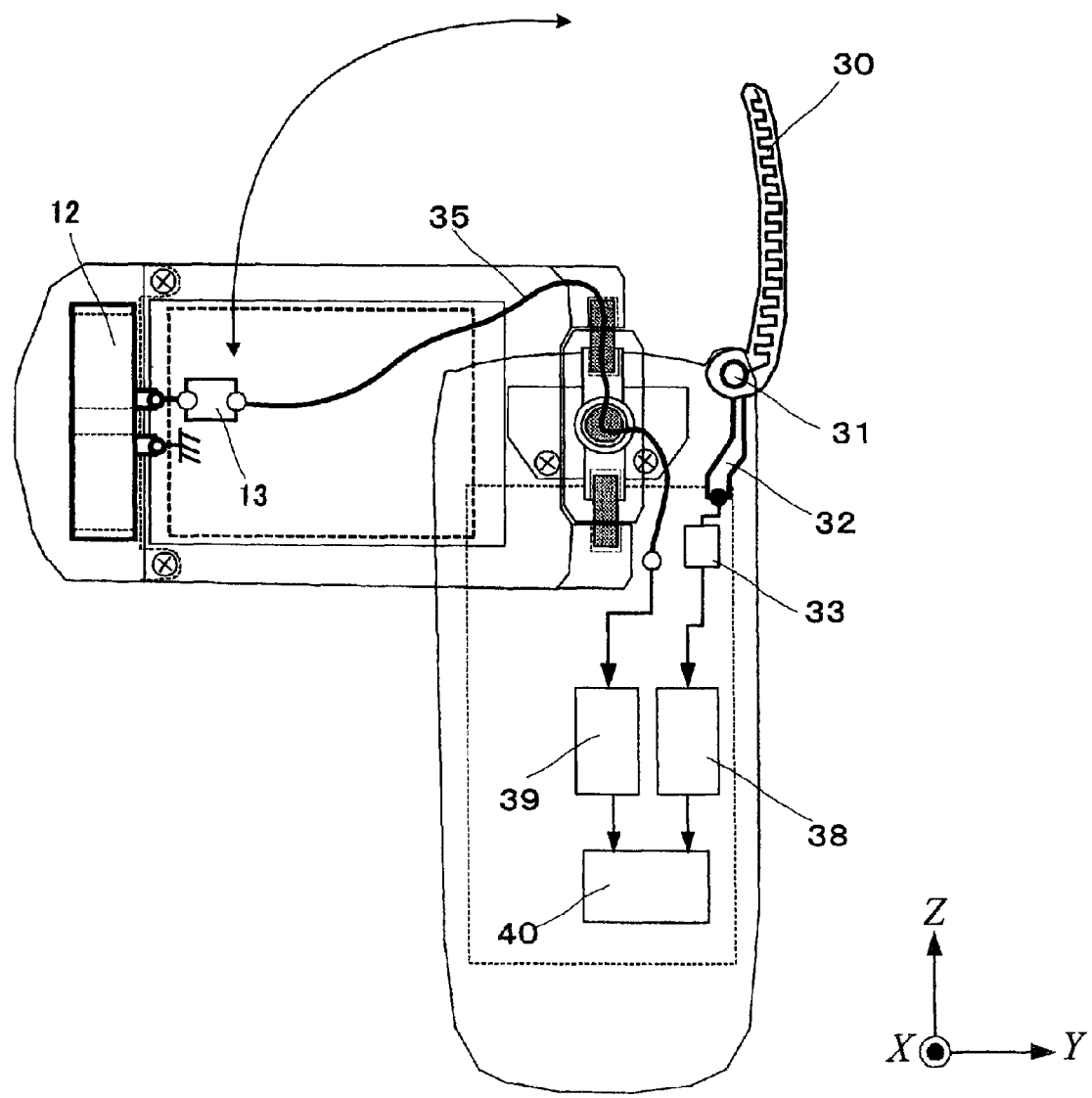
FIG. 16 shows the diversity configuration of the cell phone equipped with a broadcast receiver according to the third embodiment.

In case digital broadcasts are to be received, a configuration of a diversity system will enhance the receiving sensitivity where a receiver part 38 and a receiver part 39 convert signals from the antennas to baseband signals or IF signals and a signal processing part 40 performs synthesis or signal selection as shown in FIG. 16, instead of using a high frequency switch to select an antenna.

In FIG. 16 showing the L-open state, in case the lower housing 2 is held by a hand of the user, a high diversity effect is obtained because of the positions of the loop element 12 and the fold-down meander antenna 30 and polarization. In the open, viewer or closed state also, a certain level of diversity effect is obtained.

The meander line of the fold-down meander antenna 30 may be a helical line of a winding structure that operates as an electric monopole. The fold-down meander antenna 30 need not rotate about a rotation axis but may have a telescopic structure including a container part inside a housing.

The fold-down meander antenna 30 may have a permanently extended structure instead of a telescopic structure while obtaining the same advantages except one related to the housed state.

While it is desirable from the viewpoint of the diversity performance that one of the antennas is a magnetic field antenna such as a loop antenna or a slot antenna and the other is an electric field antenna such as a monopole antenna or dipole antenna, antennas of the same mode or same form may deliver the improved effect with respect to the position of a hand of the user in the viewer state as far as one of the antennas is arranged at the top of the housing and the other in close proximity to a hinged part.

As described above, with a cell phone equipped with a broadcast receiver according to this embodiment, it is possible to obtain a high receiving sensitivity at all timed while suppressing to a low level the degradation of antenna performance caused by electromagnetic interaction between a broadcast receiving antenna and a cell phone communication antenna and or interference to the broadcast receiving feature due to transmit waves of cell phone communications.

Fourth Embodiment

Figure 17:
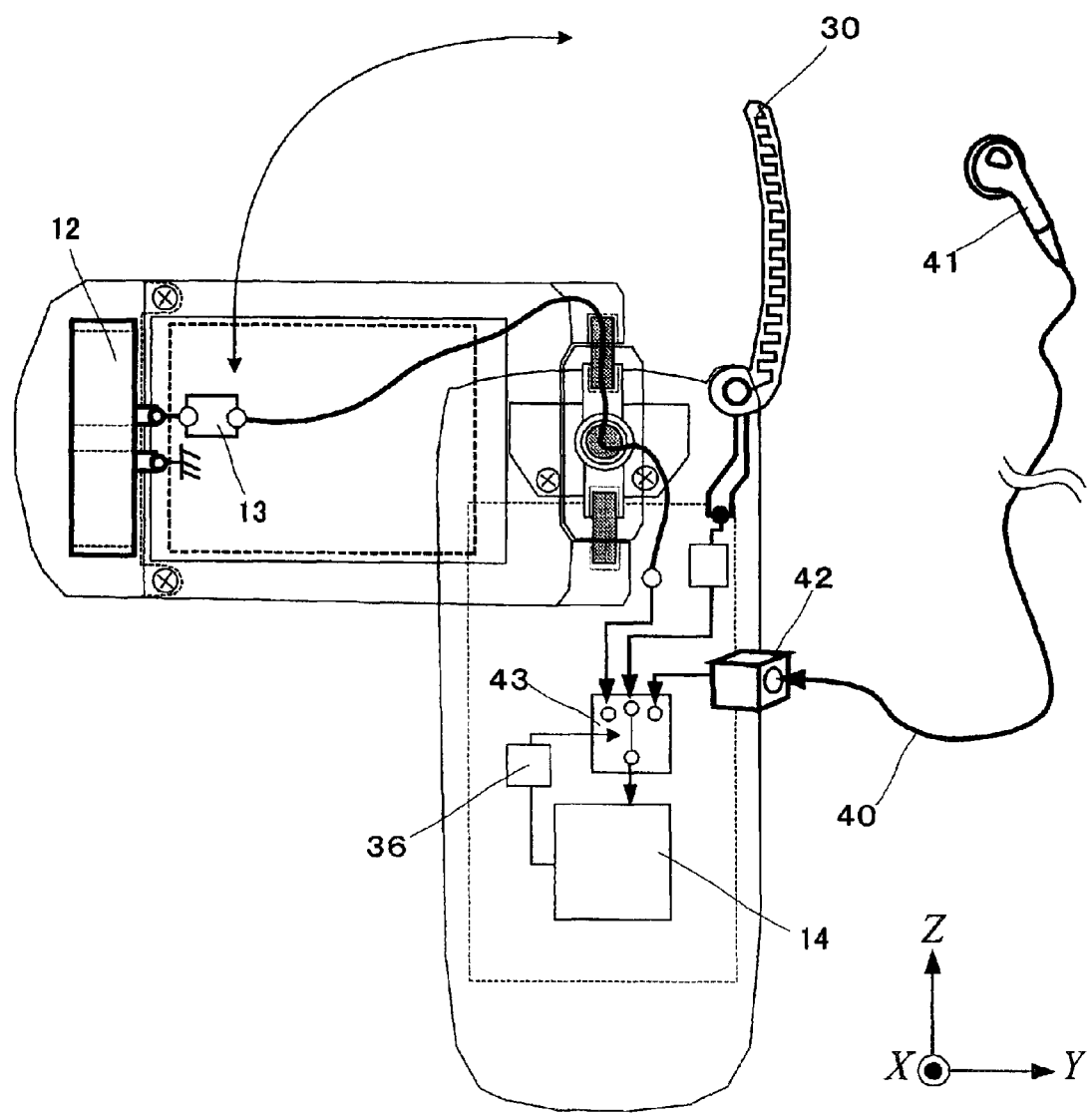
FIG. 17 is a front view of a cell phone equipped with a broadcast receiver according to the fourth embodiment in the L-open state.

FIG. 17 shows a basic configuration of a cell phone equipped with a broadcast receiver according to the fourth embodiment of the invention. In FIG. 17, a component given a same sign as FIG. 13 performs the same operation and thus detailed description of such a component is omitted.

The cell phone equipped with a broadcast receiver shown in FIG. 17 includes an earphone cable 40 operating as a broadcast receiving antenna on top of the configuration shown in FIG. 13.

The earphone cable 40 transmits a sound signal to an earphone 41. Part of the earphone cable 40 operates also as an external antenna to receive television broadcast waves.

The television broadcast wave receives by the earphone cable 40 is input to a high frequency switch 43 via an earphone connector 42.

The length of the earphone cable 40 is set to about 40 cm to 100 cm. This length corresponds to about 0.7 times to 2.3 times the wavelength in the television broadcast reception band. An earphone cable whose length is below 0.7 times the wavelength may be used as far as practically sufficient antenna performance is obtained.

The high frequency switch 43 selects one of a loop element 12, a fold-down meander antenna 30 and the earphone cable 40 and inputs the received broadcast waves to a broadcast receiver circuit 14.

A control part 36 operates to control the high frequency switch 43 so that the high reception level of the broadcast receiver circuit 14 will be maintained at all times. This selects one of the three types of antennas whichever has the highest antenna gain on every occasion.

Figure 18:
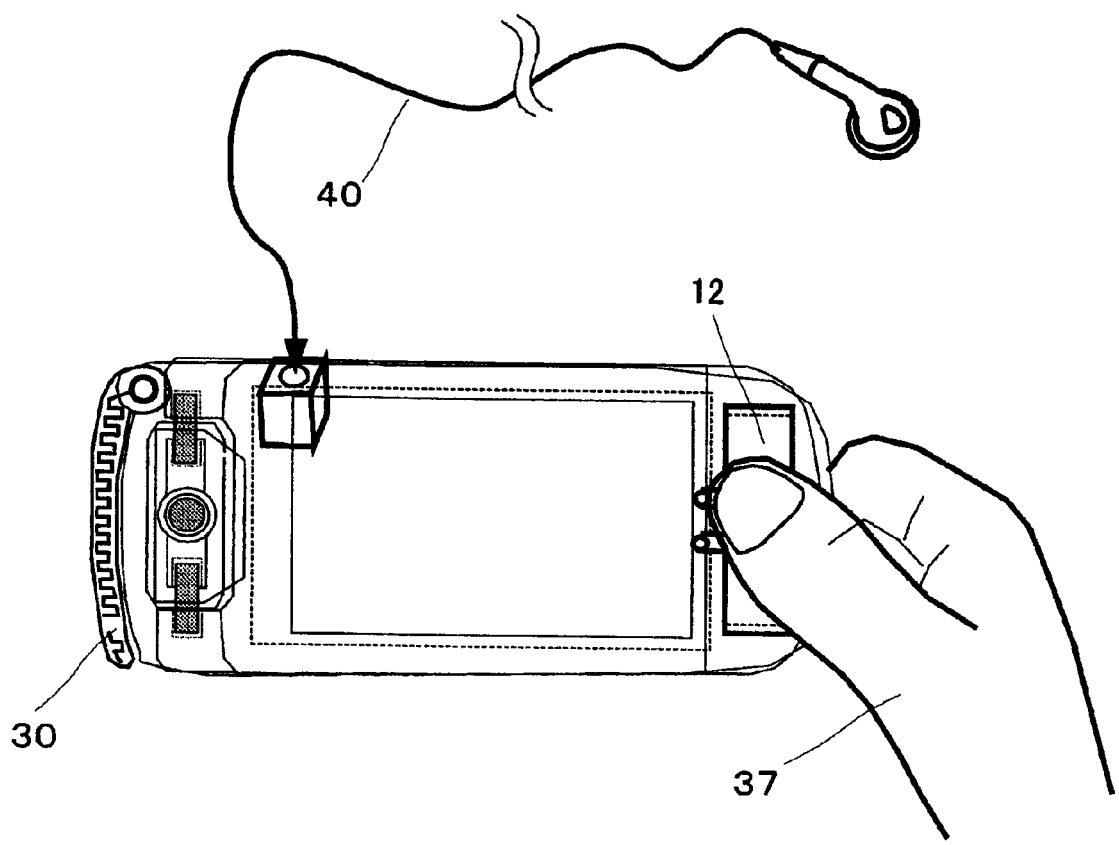
FIG. 18 shows the cell phone equipped with a broadcast receiver according to the fourth embodiment in the viewer state with the top end held.

With this operation, for example, even in case the fold-down meander antenna 30 is housed in the viewer state and a section of a cell phone in close proximity to the loop element 12 is held by a hand of the user as shown in FIG. 18, the earphone cable 40 provides a high receiving sensitivity.

Figure 19:
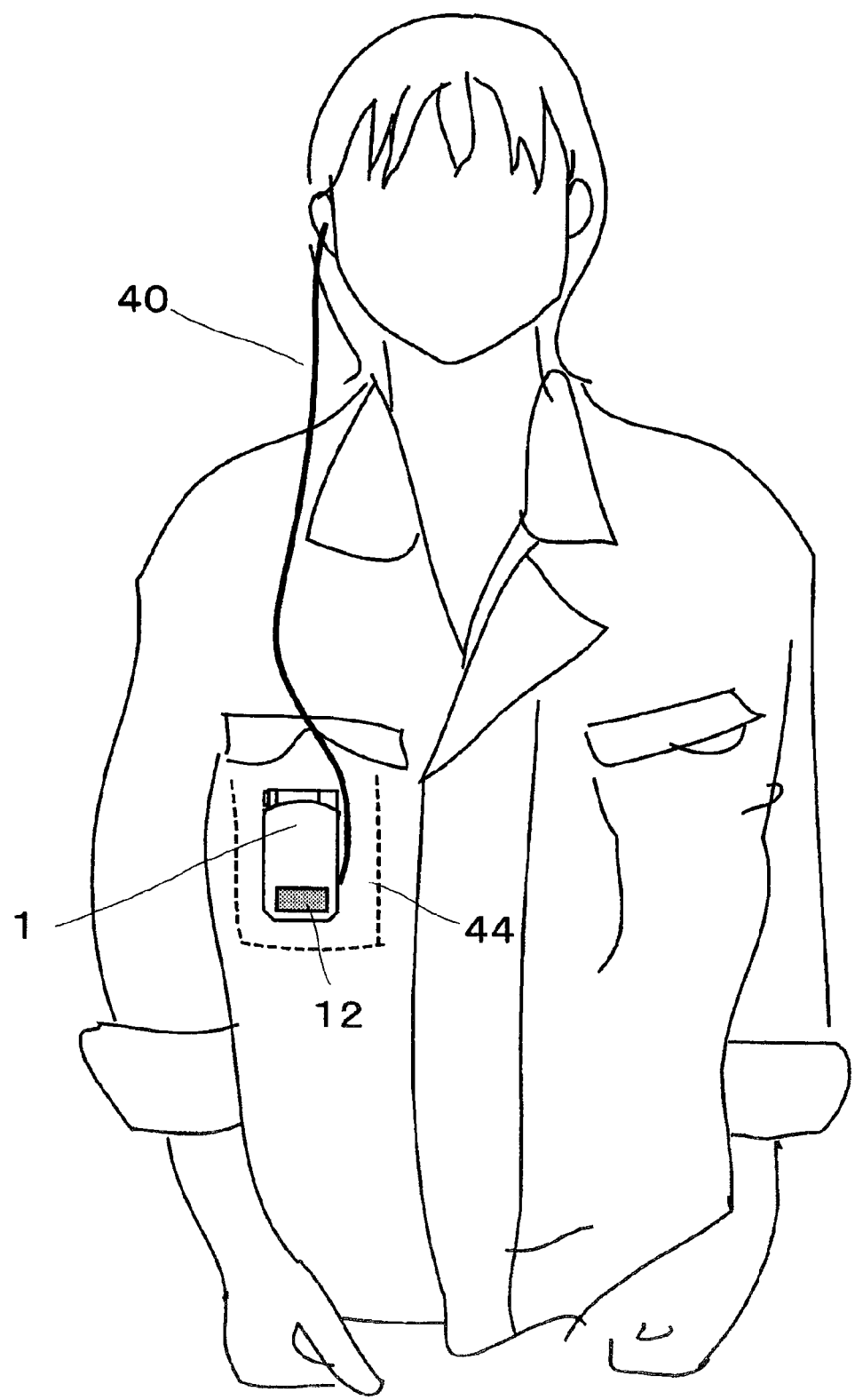
FIG. 19 shows the cell phone equipped with a broadcast receiver according to the fourth embodiment inserted in a breast pocket.

In case a cell phone is used while inserted in a breast pocket 44 of the user as shown in FIG. 19, the antenna element and the human body are in close proximity to each other (for example about 10 to 30 mm apart), the fold-down meander antenna 30 or the earphone cable 40 operating in the electric field mode experiences degradation of antenna performance. The antenna performance of the loop element 12 is hardly degraded because its loop plane is orthogonal to the surface of human body. In this case, a high receiving sensitivity is obtained with the loop element 12.

Diversity operation using the three types of antennas also delivers a high receiving sensitivity.

A configuration is possible where means for detecting whether the earphone cable 40 is inserted in the earphone connector 42 and the conditions for selecting one of the three types of antennas are determined based on the detection result.

For example, in case the earphone cable 40 is inserted in the earphone connector 42, the earphone cable 40 may be forcibly selected.

Or, in case the earphone cable 40 is not selected, control may be made to abort a procedure or processing of selecting the earphone cable 40 and select either the loop element 12 or the fold-down meander antenna 30, or perform diversity operation.

Control may be made to select either the earphone cable 40 or the loop element 12 depending on whether the earphone cable 40 is inserted and select between the one selected above and the fold-down meander antenna 30, or perform diversity operation.

As described above, with a cell phone equipped with a broadcast receiver according to this embodiment, one with the highest performance is selected from among an antenna arranged in close proximity to a hinged part, an antenna arranged at the top end of a housing and a earphone antenna, or two antennas with the first highest and second highest performance is effectively selected, or diversity operation is performed thus obtaining a high receiving sensitivity at all times.

While various embodiments of the invention have been described above, the invention is not limited to the configurations shown in the embodiments. The invention expects that those skilled in the art will modify and adapt the invention based on the description and known techniques and such modifications and adaptations are included in the scope of protection.

This application is based on the Japanese patent application filed Oct. 28, 2004 (Japanese Patent Application No. 2004-314255) and its content is incorporated herein as a reference.

INDUSTRIAL APPLICABILITY

As mentioned above, the invention provides high cell phone antenna performance and a high television broadcast receiving sensitivity in various use states and thus contributes to sophistication of a clamshell cell phone equipped with a television broadcast receiving feature.

The invention claimed is:

1. A cell phone equipped with a broadcast receiver comprising:
 a first housing;
 a second housing;
 a hinged part for rotatably connecting the first housing and the second housing;

a loop element comprising a first broadcast receiving antenna element provided at an end of the first housing opposite to an end where the hinged part is connected;

a cell phone communication antenna element provided at an end of the second housing opposite to an end where the hinged part is connected; and a changing unit for changing resonance frequency of one of:
(1) the first broadcast receiving antenna element to a frequency higher than a radio frequency band of cell phone communications in case the cell phone communications is given a priority; and
(2) the cell phone communication antenna element to a frequency higher than a radio frequency band of television broadcasts in case the television broadcasts receiving performance is given a priority.

2. The cell phone equipped with a broadcast receiver according to claim 1, wherein
the first broadcast receiving antenna element comprises a magnetic field antenna and
the cell phone communication antenna element comprises an electric field antenna.

3. The cell phone equipped with the broadcast receiver according to claim 1, wherein
a circuit board and a conductor component are arranged closer to the hinged part than the first broadcast receiving antenna element in the first housing, and
a circuit board and a conductor component are arranged closer to the hinged part than the cell phone communication antenna element in the second housing.

4. The cell phone equipped with the broadcast receive according to claim 1, wherein one end of a power feeding part of the loop element is connected to a section corresponding to high frequency ground potential of the first housing.

5. The cell phone equipped with the broadcast receiver according to claim 1, wherein the cell phone communication antenna element comprises a monopole element.

6. The cell phone equipped with the broadcast receiver according to claim 1 further comprising:
a second broadcast receiving antenna element provided in close proximity to the end of the second housing where the hinged part is connected; and
a selecting unit for selecting either the first broadcast receiving antenna element or the second broadcast receiving antenna element or a diversity reception unit for performing diversity reception.

7. The cell phone equipped with the broadcast receiver according to claim 6, wherein
the first broadcast receiving antenna element comprises a magnetic field antenna, and
the second broadcast receiving antenna comprises an electric field antenna.

8. The cell phone equipped with the broadcast receiver according to claim 7, wherein the second broadcast receiving antenna element is a telescopic meander antenna or a helical antenna.

9. The cell phone equipped with the broadcast receiver according to claim 6, further comprising:
an earphone cable antenna comprising a third broadcast receiving antenna element; and
wherein the selecting unit selecting one of the first broadcast receiving antenna element, the second broadcast receiving antenna element and the earphone cable antenna.

10. The cell phone equipped with the broadcast receiver according to claim 9 further comprising a diversity reception unit for performing diversity reception by using all or any two of the first broadcast receiving antenna element, the second broadcast receiving antenna element and the earphone cable antenna.

* * * * *